United States Patent Office 3,501,077
Patented Mar. 17, 1970

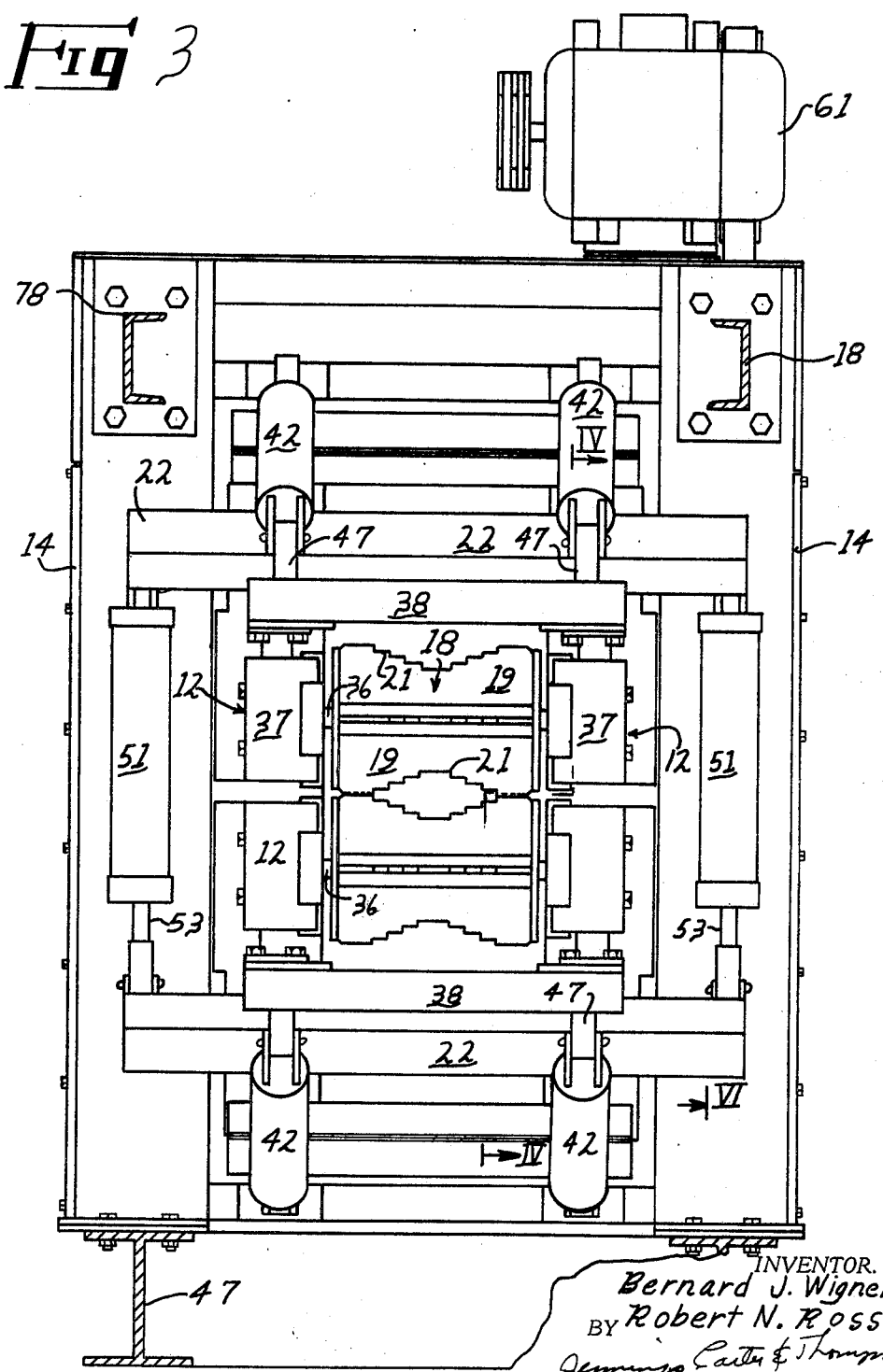

3,501,077
LOG FEEDING APPARATUS
Bernard J. Wigner and Robert N. Ross, Birmingham, Ala., assignors to Beloit Corporation, a corporation of Wisconsin
Filed Feb. 26, 1968, Ser. No. 708,020
Int. Cl. B65h 17/22; B27b 31/00
U.S. Cl. 226—108                                      1 Claim

ABSTRACT OF THE DISCLOSURE

Apparatus having opposed sets of driven log conveying units disposed to engage a log between them and move it axially, together with apparatus effective to cause the log feeding units to move apart equally and oppositely, whereby a log is conveyed through the apparatus with the longitudinal center line of the log passing substantially along a theoretical median line between the two units. The apparatus is especially effective for conveying logs to and from ring type debarkers wherein it is desired to feed the log through the ring at substantially the geometrical center of the ring.

---

Our invention relates to apparatus for conveying logs and the like and has for an object the provision of oppositely disposed feeding units to engage the logs, together with apparatus to cause the opposed sets of log conveying units to move apart substantially equally and oppositely, whereby logs of different diameters may be conveyed through the apparatus with the longitudinal centers thereof traveling susbtantially along the median line between the two units.

Another object is to provide an articulated log feeding means which embodies a section on the infeed side of each opposed unit in turn carrying a section on the outfeed side thereof pivotally connected to the infeed section, together with means to drive the feed means for the logs, and further having means to bias the sections together so that the log is resiliently held between the conveying units.

Another object of our invention is to provide apparatus of the character designated which has flaring infeed guide sections, whereby an approaching log, if desired, may open the device automatically as it comes between the sets of feeding mechanisms.

Other objects of our invention are to provide a rugged, articulated apparatus adapted to feed logs to and remove them from devices such as ring type debarkers which shall be positive in operation and which shall present the log substantially to the ring at its geometrical center, regardless of the diameters of the logs within the range for which the apparatus is designed.

Apparatus illustrating features of our invention is shown in the accompanying drawings forming a part of this application in which:

FIG. 3 is an end view;

FIG. 4 is a detail sectional view taken generally along line IV—IV of FIG. 3;

FIG. 5 is a detached view illustrating two positions of one of the lower log feeding sets; and, FIG. 6 is a somewhat diagrammatic view taken generally along line VI—VI of FIG. 3, drawn to a reduced scale and illustrating the drive means for the log feeding units.

Figure 1:
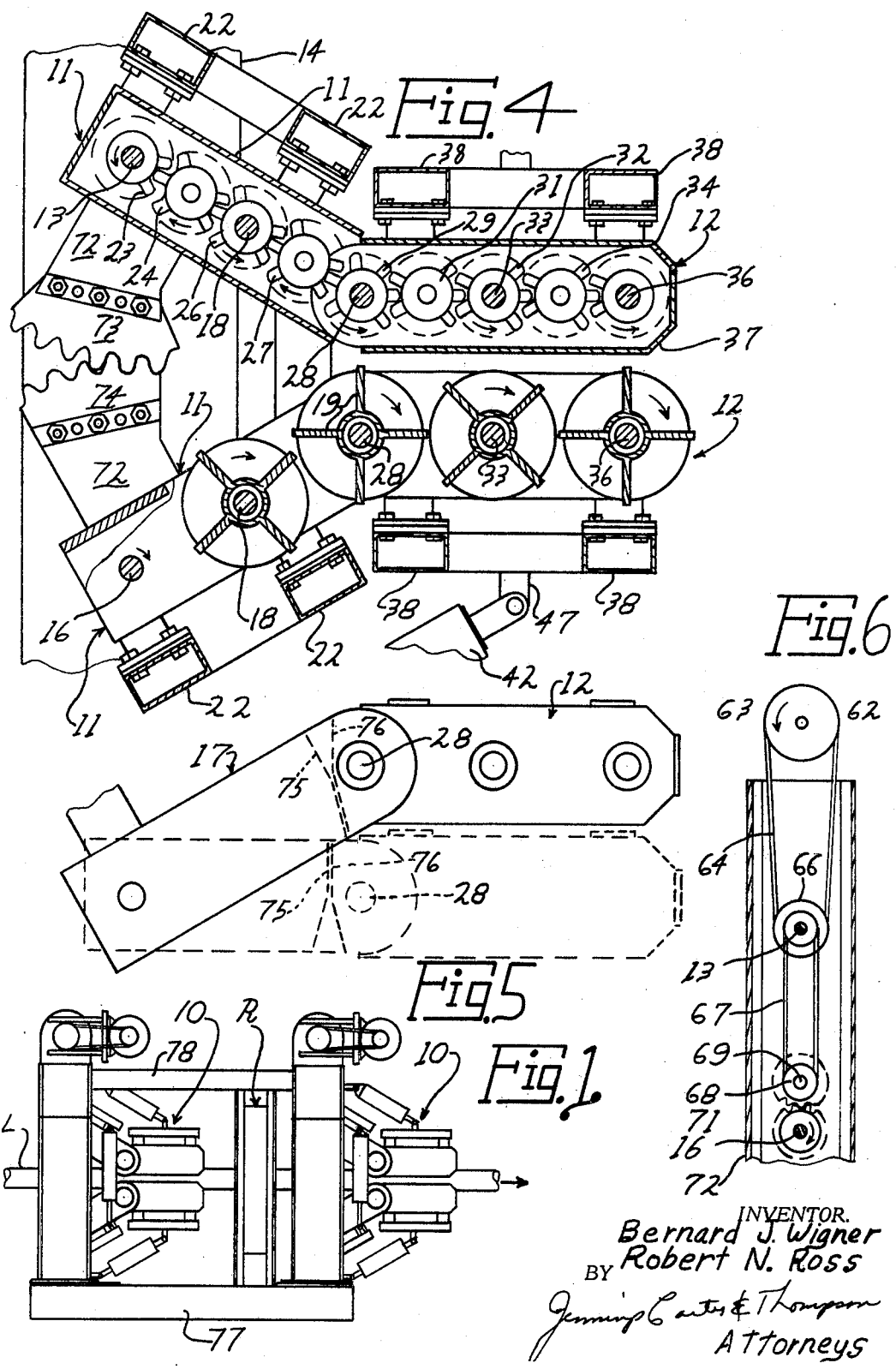
FIG. 1 is a side elevational view, drawn to a reduced scale, and showing infeed and outfeed groups of our improved apparatus associated with a ring type debarker.
Figure 2:
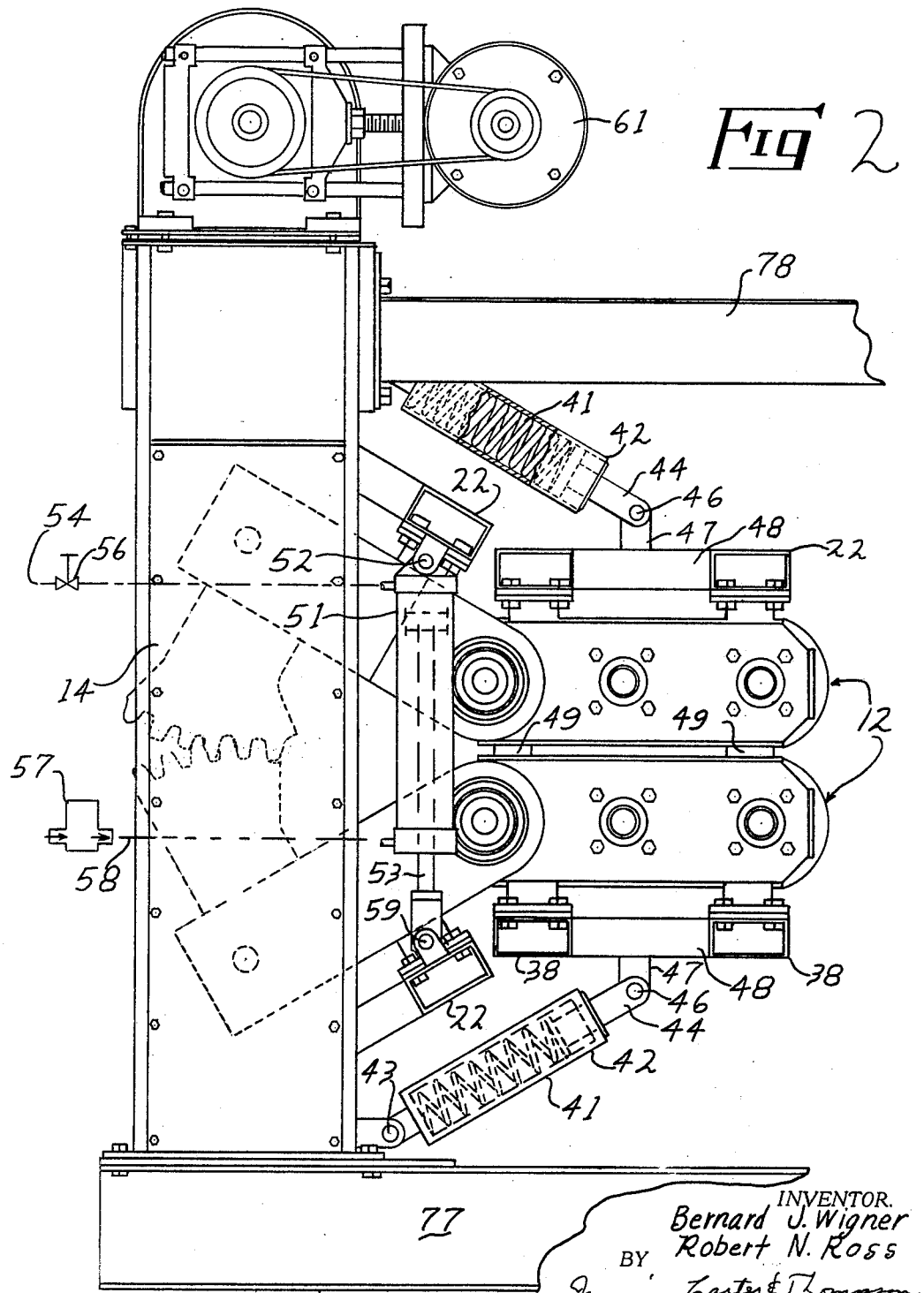
FIG. 2 is a side elevational view, drawn to an enlarged scale, of one set of the units, certain parts being broken away and in section.

Referring now to the drawings for a better understanding of our invention and referring particularly to FIG. 1, we show a ring type debarker R to and through which a log L is to be fed and removed, it being the object of the invention as stated to feed the log axially along the approximate geometrical center of the ring. Our improved feed units are indicated generally by the numeral 10, there being one such unit on the infeed side of the debarker ring and one on the outfeed side, it being assumed that the logs are moving from left to right as shown in FIG. 1. In view of the fact that the units 10 are identical a description of one will suffice for both.

First, the units 10 each comprise upper nad lower sets of discrete log feeding sets or units. Each of the sets comprises an infeed section indicated generally by the numeral 11 and an outfeed section indicated generally by the numeral 12. The infeed sections are pivotally mounted to rotate about driven shafts 13, the shafts in turn being mounted in spaced, vertically disposed housings 14 which may be fabricated of angles, plates and the like. Similarly, the lower infeed section 11 is pivotally mounted on a lower driven shaft 16, the shafts being driven as will be later explained.

The units 11 include spaced, box-like housings 17. A shaft 18 spans the housings 17 and between the housings 17 carries a log engaging roll 18. The roll preferably is constructed of a plurality of vane-like plates 19 secured to a central hub, and the log engaging surfaces may be stepped as indicated at 21. It will also be noted that the side frames are joined by cross structures 22, whereby the side frame structures making up the infeed section are rigidly joined and pivotally mounted to rotate about the shaft 13.

Mounted on the shaft 13, inside the enclosure of each side frame 17 is a gear 23. The gear 23 drives an idler gear 24. The shaft 18 in turn is driven from gear 24 through a gear 26. For the purpose of driving the other rolls included in the section 12 we provide an idler gear 27 in one side framework or housing 17 of the infeed unit 11.

Pivotally mounted at the lower end of the unit 11, on a shaft 28, is the outfeed unit 12. A gear 29 is in mesh with gear 27 and drives the shaft 28. The shaft 28 in turn carries one of the rolls 18. In simialr manner, an idler gear 31 drives a gear 32 on a shaft 33. An idler gear 34 drives shaft 36. As will be understood, the log engaging and driving rolls 18 also are mounted on shafts 33 and 36. The unit 12 likewise comprises side frame members 37 joined together by cross members 38.

The lower or opposed units of each set are identical with those just described and the parts are numbered correspondingly in the drawings. Thus, the infeed section of the lower set is pivoted about the shaft 16, embodies the corresponding shafts 18, 28, 33 and 36, all mounted in the housings at each side. The outfeed sections 12 are pivoted to the infeed section 11 on the shaft 28. In similar manner, both sections embody the cross members 22 and 38, respectively. Further, it will be noted that the log engaging blades 19 of the upper and lower sets carried by the outfeed sections 12 are driven in timed relation so that, although the blades slightly overlap, there is no interference between them.

The outfeed sections 12 are biased toward each other by means of compression springs 41 mounted in housings 42. The housings are pivoted to the framework as indicated at 43 and projecting from the outer ends thereof are rods or plungers 44. The plungers are pivoted at 46 to brackets 47 monted on the fore and aft cross members 48 connecting the transverse framework 38. Pads or stops 49 are provided on, for instance, the lowermost of the outfeed sections 12 to limit inward movement toward each other.

While as shown the infeed sections 11, due to the outwardly flaring sections make the unit self-opening, nevertheless we propose to provide fluid pressure cylinders 51, the cylinders being pivoted at 52. The piston rods 53 are pivoted to extensions of the cross framework 22 of the upper and lower units as at 59. Pressure is supplied from a line 54 from a source not shown through a manually controlled valve 56 to the non-piston rod ends of the cylinders 51. A hydraulic accumulater 57 is connected to the other ends of the cylinders 51 through a line 58.

Power for driving the rollers of the feed sections is provided by an electric motor or the like 61, the motor being connected by belts and pulleys as shown to drive an upper shaft 62. A sprocket 63 surrounds the shaft 62 and through a chain 64 drives a sprocket 66 which is fast on the shaft 13. A chain 67 connects the sprocket 66 to a sprocket 68 on a jack shaft 69. A gear 71 fastened on the shaft 69 drives a gear 72 fast on the shaft 16. Thus, as viewed in FIG. 6 the shaft 13 rotates counter-clockwise, whereas the shaft 16 rotates clockwise.

Secured to the adjacent flared surfaces of the sections 11 are supports 72 in the form of brackets. At the ends of the supports are arcuate gears 73 and 74, the pitch lines of which are struck about the respective centers of the shafts 13 and 16.

From what has been described it will be seen that each of the opposed sections 11 and 12 are articulated relative to each other and that the same can move outwardly relative to each other. Further, when the sections 11 move, the arcuate gear arrangement assures that both of them move substantially equally and oppositely, regardless of whether the upper or lower section 11 is engaged by the log and hence pushed upwardly or downwardly. At the same time, by admitting fluid under pressure to the tops of the cylinders 51 sections 11 may be pivoted about the shafts 13 and 16, in effect opening them up at their converging ends. At the same time, the springs 41 urge the outfeed sections 12 toward each other, but permit the logs to enter therebetween.

As shown in FIG. 5, we may provide framework adjacent the shaft 28 which, when the parts move from the full line position to the dotted line position, namely, to full open position, come together at the points 75 and 76, thus to prevent the infeed and outfeed sections 11 and 12 from pivoting too far toward open position about the shafts 28.

From what has been described the construction and operation of our improved apparatus may now be explained and more fully understood. First, it will be noted that two of the complete units may be mounted, one on either side of the ring R and connected by suitable base plate framework 77 and horizontal framework 78. With the logs entering from the left as viewed in FIG. 1, it is possible, with small diameter logs to permit them simply to pass into the flaring inlet of the sections 11 and, due to the inward motion of the logs open the sections. However, if desired fluid may be admitted by valve 56 so that the sections are opened by the cylinders 51, it being understood that the accumulator 57 urges the sections together sufficiently to cause the log to be gripped by the feeding devices 19. The log thus passes through the lefthandmost group of the units as shown in FIG. 1, and is presented axially to the debarker ring R at its geometrical center. The log then passes into the righthandmost section of the unit as shown in FIG. 1 and is discharged, being at all times held at the geometrical center of the ring. It will be noted that the arcuate gears 73 and 74 assure that the entering or infeed sections 11 move substantially equally and oppositely, thus to hold the log centered. The springs 41 in the housings 42 hold the outfeed sections together, assuring that the log is frictionally gripped by the rolls 19.

While we have shown our invention in but one form, it will be obvious to those skilled in the art that it is not so limited, but is susceptible of various other changes and modifications without departing from the spirit thereof.

What we claim is:
1. In apparatus adapted for moving logs to or from debarkers and the like,
    (a) opposed sets of driven log feeding members disposed to engage a log therebetween and move it axially, each of said sets comprising infeed and outfeed sections pivoted together intermediate their ends, said infeed sections being mounted on pivots fixed relative to each other,
    (b) means to move the infeed sections apart about the pivots thereof, thereby to open up the infeed side of the apparatus for the entrance of logs between the sets of feeding members,
    (c) means biasing the outfeed sections toward each other about the pivotal connections to their respective infeed sections, and
    (d) means interposed between the sets effective upon pivotal movement of one set to move the set substantially equally and oppositely, thus maintaining the effective log engaging center line between said sets of feeding members at substantially the same location, whereby logs of different diameters pass through the apparatus with the axial center lines thereof moving substantially along said effective log engaging center line.

References Cited

UNITED STATES PATENTS

| | | |
|---|---|---|
| 2,983,291 | 5/1961 | Dick. |
| 3,045,728 | 7/1962 | Hutchinson et al. |
| 3,098,512 | 7/1963 | Kendrick. |

GIL WEIDENFELD, Primary Examiner

U.S. Cl. X.R.

144—208, 247; 226—187